US011772533B2

(12) United States Patent
Yonezawa et al.

(10) Patent No.: US 11,772,533 B2
(45) Date of Patent: Oct. 3, 2023

(54) SEAT UPHOLSTERY CLIP

(71) Applicant: YKK Corporation, Tokyo (JP)

(72) Inventors: Seiichiro Yonezawa, Macon, GA (US); Eric Chew, Macon, GA (US); Satoshi Nakada, Macon, GA (US)

(73) Assignee: YKK Corporation

( * ) Notice: Subject to any disclaimer, the term of this patent is extended or adjusted under 35 U.S.C. 154(b) by 0 days.

(21) Appl. No.: 17/675,638

(22) Filed: Feb. 18, 2022

(65) Prior Publication Data

US 2023/0264615 A1 Aug. 24, 2023

(51) Int. Cl.
*B60N 2/58* (2006.01)

(52) U.S. Cl.
CPC .................. *B60N 2/5825* (2013.01)

(58) Field of Classification Search
CPC .................................................. B60N 2/5825
See application file for complete search history.

(56) References Cited

U.S. PATENT DOCUMENTS

| 9,555,728 B2 | 1/2017 | Galbreath et al. | |
| 2016/0280105 A1* | 9/2016 | Sato | B60N 2/5825 |
| 2017/0057807 A1* | 3/2017 | Agonia | B60N 2/5825 |
| 2018/0162719 A1* | 6/2018 | Matsumura | B68G 7/052 |
| 2018/0304782 A1* | 10/2018 | Yoshino | B60N 2/5825 |
| 2019/0104859 A1* | 4/2019 | Murasaki | A47C 31/023 |
| 2019/0142181 A1* | 5/2019 | Matsumura | B68G 7/00 |
| | | | 297/452.59 |
| 2019/0275918 A1* | 9/2019 | Mayumi | F16B 21/073 |
| 2021/0053472 A1* | 2/2021 | Eldridge | A47C 31/023 |
| 2021/0137279 A1* | 5/2021 | Nanbu | B68G 7/12 |
| 2022/0242287 A1* | 8/2022 | Cuerda | F16B 2/22 |

FOREIGN PATENT DOCUMENTS

| DE | 4219656 | 12/1992 |
| JP | S5512885 U | 1/1980 |
| JP | S63015983 A | 1/1988 |
| JP | 2006220180 | 8/2006 |

(Continued)

OTHER PUBLICATIONS

Cuerda, Mariano: International Preliminary Report on Patentability for PCT/IB2020/053222, filed Apr. 3, 2020, dated Dec. 16, 2021, 7 pgs.

(Continued)

*Primary Examiner* — Jason W San
(74) *Attorney, Agent, or Firm* — Taylor English Duma LLP

(57) ABSTRACT

A clip for securing a cover to a base can include a chuck defining a suspender retention cavity, the suspender retention cavity sized and configured to receive a suspender attached to the cover; a first leg extending from the chuck and including a first barb, the first barb extending outward with respect to a centerline axis of the clip; and a second leg extending from the chuck and including a second barb, the second barb extending outward with respect to the centerline axis of the clip; wherein a total leg offset distance measured in an X-axis direction of the clip between a centerline of the barb of the first leg and a centerline of the barb of the second leg is equal to or less than a secondary width of either of the barb of the first leg and the barb of the second leg in the X-axis direction.

20 Claims, 11 Drawing Sheets

(56) References Cited

FOREIGN PATENT DOCUMENTS

| JP | 20070275557 A | 10/2007 |
|----|---------------|---------|
| JP | 2013165535 | 8/2013 |
| JP | 2015048050 | 3/2015 |
| JP | 6399917 | 10/2018 |
| WO | 2020245670 | 12/2020 |

OTHER PUBLICATIONS

Cuerda, Mariano: International Search Report and Written Opinion for PCT/IB2020/053222, filed Apr. 3, 2020, dated May 30, 2020, 8 pgs.

Microfilm of the specification and drawings annexed to the written application of Japanese Utility Model Application No. 097147/1978 (laid-open No. 0128851980) (Toyo Kogyo Co., Ltd) Jan. 26, 1980 (Jan. 26, 1980) description p. 7 lines 15-17, Fig. 9 **corresponds with Foreign Patent Reference JPS5512885U cited herewith.

YKK Corporation; International Search Report and Written Opinion for PCT/JP2023/005874, filed Feb. 17, 2023, dated May 16, 2023, 21 pgs.

\* cited by examiner

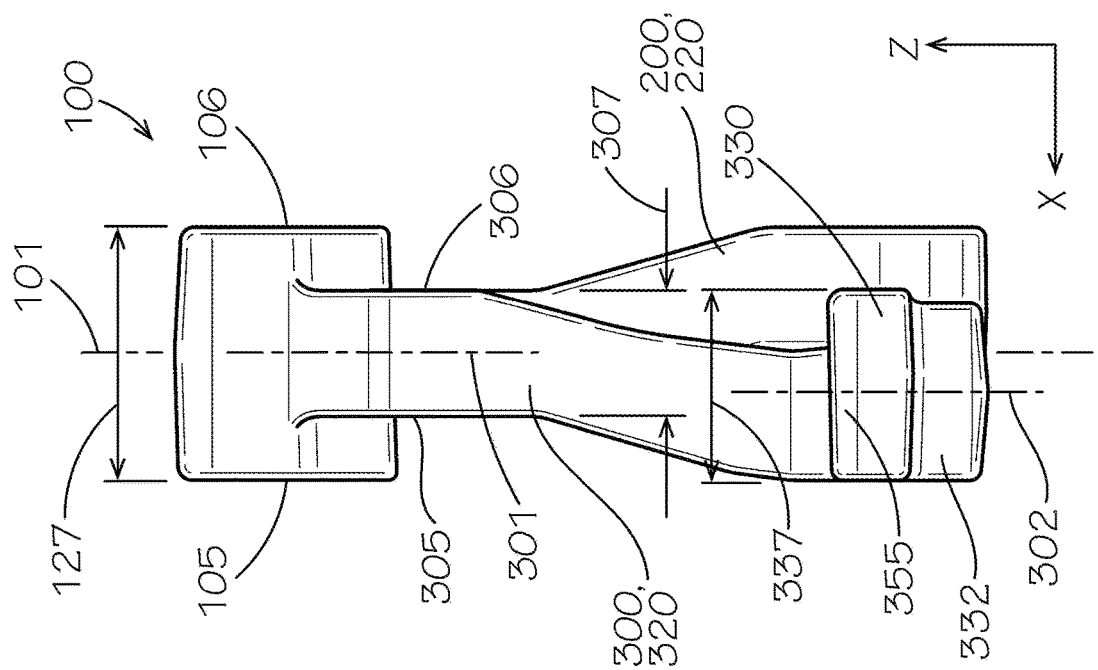
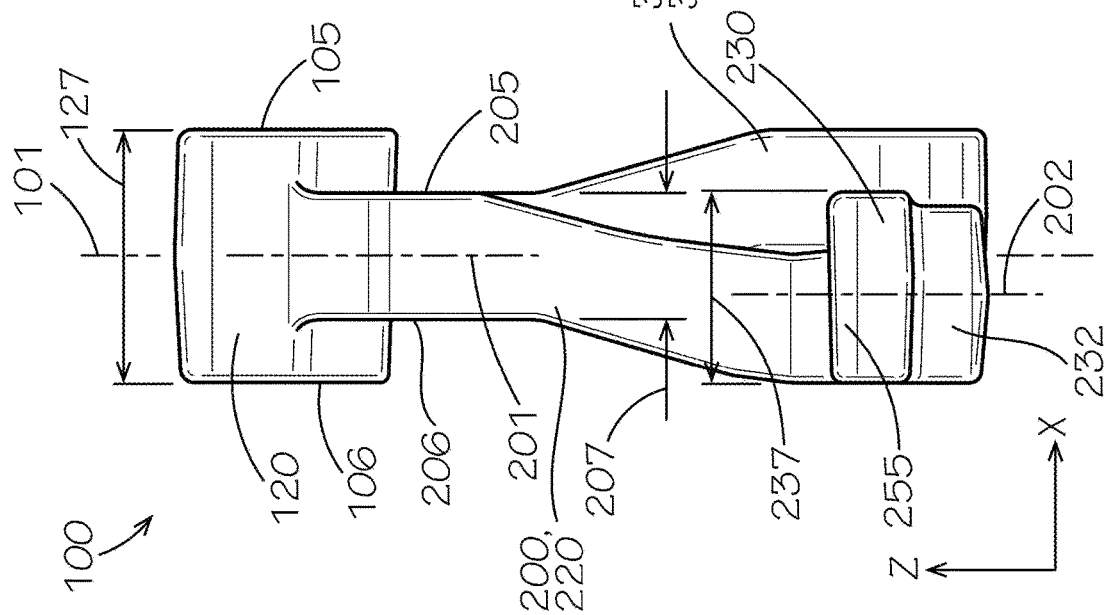

SEAT UPHOLSTERY CLIP

TECHNICAL FIELD

Field of Use

This disclosure relates to fasteners. More specifically, this disclosure relates to fastening clips for vehicle upholstery.

Related Art

Seating for drivers or passengers of a vehicle can include covered or upholstered surfaces. The seating can incorporate a base, which can be a cushion, and an upholstery cover. While some vehicles include seating that does not require the separate base or an upholstery cover, many vehicles include both for comfort, aesthetics, and/or other reasons. A manufacturer typically uses a plurality of fasteners to secure the upholstery cover—whether fabric, leather, or some other material—in place around the base. Some fastening methods involve the use of wires or other fasteners embedded inside foam cushions, which can require a greater number of parts and greater design complexity overall and can limit the variety of materials available to form a body of the base. Some bases using other materials and manufacturing methods can require new assembly methods and even new fasteners.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a clip for securing a cover to a base, the clip comprising: a chuck defining a suspender retention cavity, the suspender retention cavity sized and configured to receive a suspender attached to the cover; a first leg extending from the chuck and comprising a first barb, the first barb extending outward with respect to a centerline axis of the clip; and a second leg extending from the chuck and comprising a second barb, the second barb extending outward with respect to the centerline axis of the clip; wherein a total leg offset distance measured in an X-axis direction of the clip between a centerline of the barb of the first leg and a centerline of the barb of the second leg is equal to or less than a secondary width of either of the barb of the first leg and the barb of the second leg in the X-axis direction.

In a further aspect, disclosed is a clip for securing a cover to a base, the clip comprising: a chuck defining a suspender retention cavity, the suspender retention cavity sized and configured to receive a suspender attached to the cover; a first leg extending from the chuck and comprising a first barb, the first barb extending outward with respect to a centerline axis of the clip, the first barb defining an inside barb shoulder extending from and angled with respect to a portion of the first leg extending from the chuck; and a second leg extending from the chuck and comprising a second barb, the second barb extending outward with respect to the centerline axis of the clip, the second barb defining an inside barb shoulder extending from and angled with respect to a portion of the second leg extending from the chuck; wherein a tip of each of the first barb of the first leg and the second barb of the second leg extends past the corresponding inside barb shoulder in a Z-axis direction of the clip.

In yet another aspect, disclosed is a method comprising: inserting a clip for securing an upholstery cover into a hole defined in a base, the clip comprising: a chuck defining a suspender retention cavity, the suspender retention cavity sized and configured to receive a suspender attached to the cover; a first leg extending from the chuck and comprising a first barb, the first barb extending outward with respect to a centerline axis of the clip; and a second leg extending from the chuck and comprising a second barb, the second barb extending outward with respect to the centerline axis of the clip; wherein a distance in an X-axis direction of the clip between a centerline of the barb of the first leg and a centerline of the barb of the second leg is equal to or less than a thickness of either of the barb of the first leg and the barb of the second leg in the X-axis direction; and pushing the clip into a hole defined in the base without applying a moment to encourage rotation of the clip about the X-axis direction or a countering moment to prevent rotation of the clip about a Z-axis direction of the clip.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 3 is a first side view of the clip of FIG. 1.

FIG. 4 is a second side view of the clip of FIG. 1, wherein the second side view is opposite from the first side view.

DETAILED DESCRIPTION

Figure 1A:
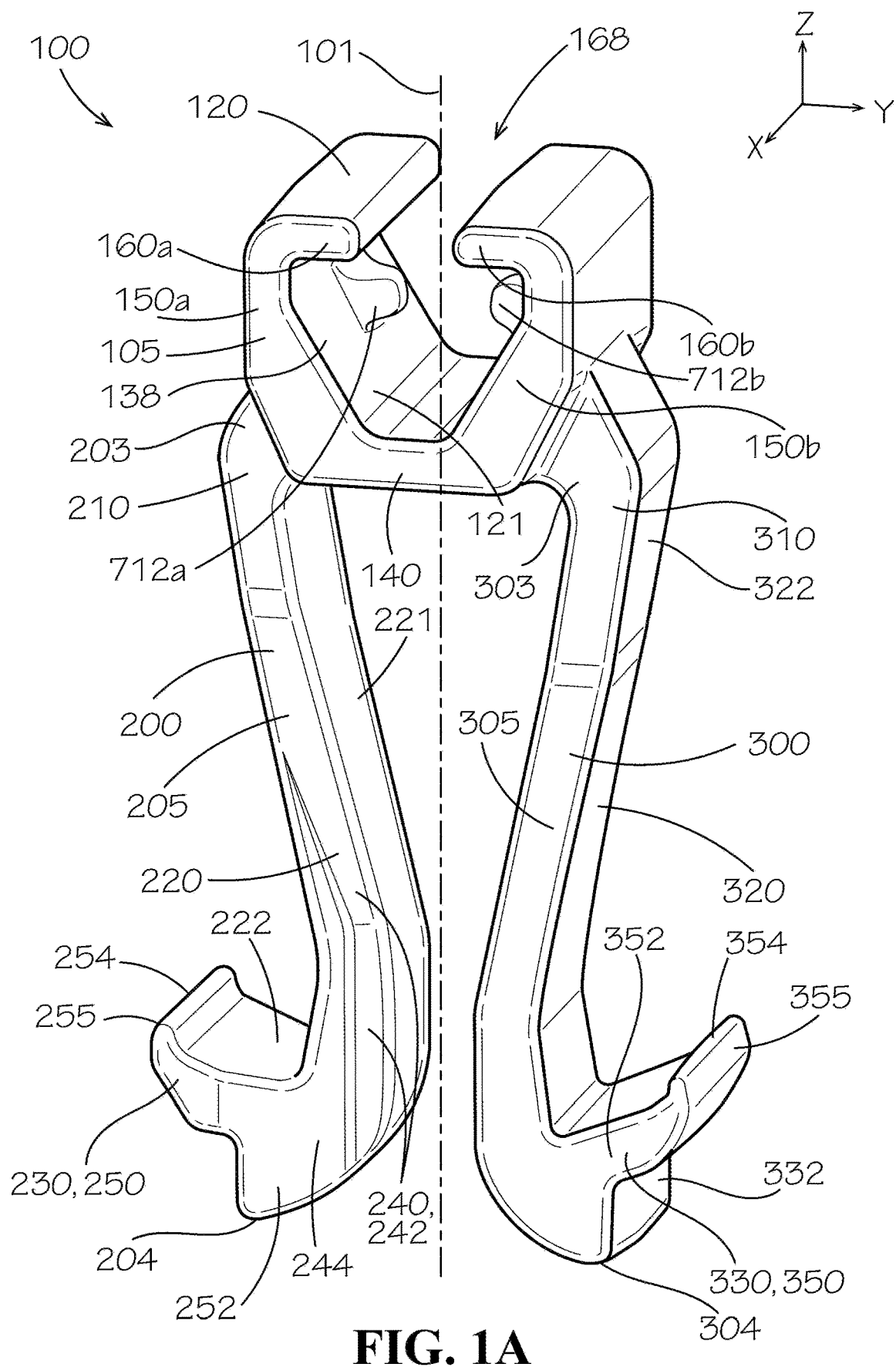
FIG. 1A is a top side perspective view of a clip in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

A cover fastening clip 100 is described below based on a coordinate axis of X-Y-Z directions shown in the figures. An X-axis direction can be referred to as a left-right or horizontal direction. For example, as shown in FIG. 1, the X-axis direction coincides with an extension direction of a suspender 700 (shown in FIG. 7) disposed in a suspender retention cavity 138 (shown in FIG. 1) of a clip 100 (shown in FIG. 1).

A Y-axis direction is orthogonal to the X-axis direction (left-right direction) and a Z-axis direction (upper-lower direction) and can also be referred to as a front-rear direction. A surface of a structural element that is parallel with the front-rear direction can be referred to as a lateral side.

An upper-lower direction is the Z-axis direction, which is orthogonal to the X-axis direction and to the Y-axis direction and typically coincides with a height direction of the clip 100. For example, a direction along which the suspender 700 can be inserted into a gap 168 (shown in FIG. 1) of the clip 100 and locked into the clip 100 can be referred to as the Z-axis direction. Also, the upper-lower direction can coincide with a direction perpendicular to a surface of a cover 1090 (shown in FIG. 10) stretched on a base 1010 (shown in FIG. 10).

In one aspect, a cover fastening clip and associated methods, systems, devices, and various apparatuses are disclosed herein. In one aspect, the clip can comprise a chuck and a pair of legs.

Figure 1B:
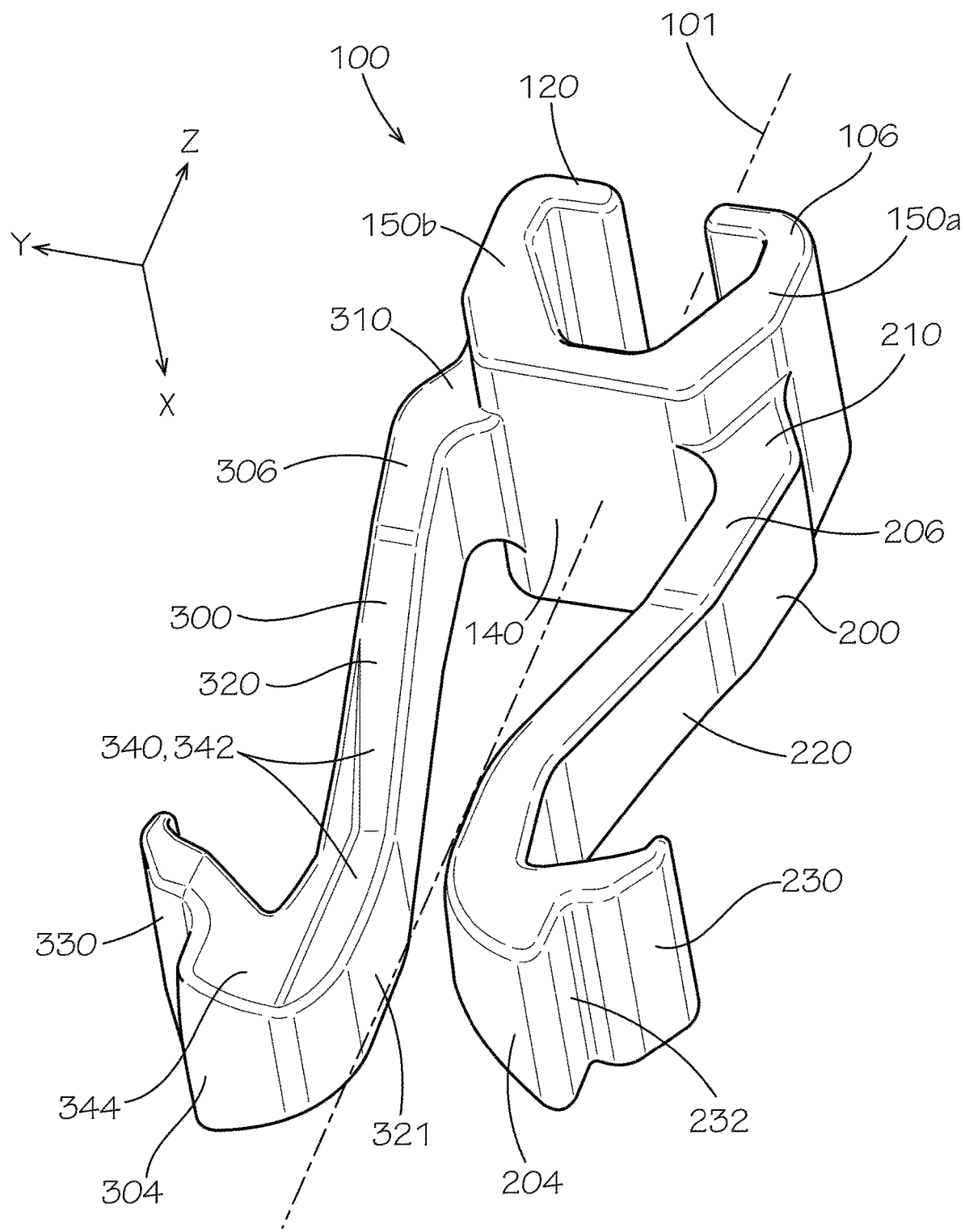
FIG. 1B is a bottom perspective view of the clip of FIG. 1.

FIGS. 1A and 1B show, respectively, top side and bottom perspective views of the clip 100 in accordance with one aspect of the current disclosure. As shown in the top perspective view of FIG. 1, the clip 100 can comprise a chuck 120, a first leg 200, and a second leg 300. The clip 100 and, more specifically, the chuck 120 can define a front end or first end 105 and a rear end or second end 106 (shown in FIG. 1B). The clip 100 and, more specifically, the chuck 120 can further define a centerline axis 101 along which the suspender 700 (shown in FIG. 7) can be inserted.

The chuck 120 can comprise a chuck base 140, a pair of chuck walls 150a,b extending from the chuck base 140, and a pair of retaining flanges 160a,b extending from the respective chuck walls 150a,b. The chuck 120 can define a suspender retention cavity 138 and can define an inner surface 121. In some aspects, as shown, tabs 712a,b can extend from the inner surface 121 of the chuck 120. The tabs 712a,b can extend in a Y-axis direction of the clip 100. The retaining flange 160a and the retaining flange 160b can define a gap 168 therebetween, which can be configured for receipt of the suspender 700.

The first leg 200 can extend from the chuck 120 and can define a proximal end 203 proximate to the chuck 120 and a distal end 204 distal from the chuck 120. More specifically, the first leg 200 can comprise a first portion 210 extending from the chuck 120 and a second portion 220 extending from and joined to the first portion 210. The first portion 210 and the second portion 220 can together form a main portion of the first leg 200. In some aspects, as shown, either of the first portion 210 and the second portion 220 can be straight when viewed from the end of the clip 100 and along the X-axis direction. More specifically, the first portion 210 can be tapered such that a portion proximate to the chuck 120 can be wider than a portion distal from the chuck 120. In some aspects, either of the first portion 210 and the second portion 220 can be curved when viewed from the end of the clip 100 and along the X-axis direction. The first leg 200 can comprise a third portion 230, which can extend from the main portion of the first leg 200 and, more specifically, from the second portion 220—and from the distal end 204 of the first leg 200. The third portion 230 can comprise a barb 250, which can extend outward with respect to the centerline axis 101 of the clip 100. In some aspects, when viewed from at least one direction, i.e., along at least the X-axis direction, the barb 250 can taper from a base 252—where it can extend from the second portion 220 of the first leg 200—to a tip 254. In some aspects, when viewed similarly, the barb 250 can define a constant thickness from the base 252 to the tip 254. The barb 250 of the first leg 200 can define an end surface 255 at the tip 254, portions of which can be rounded or flat. The first leg 200 can define a front end or first end 205 and a rear end or second end 206 (shown in FIG. 3). The first leg 200 can further define an inner surface 221 and an outer surface 222, which can be parallel to each other and can extend in the X-axis direction of the clip 100. Each of the inner surface 221 and the outer surface 222 can terminate at the distal end 204, which can be an outermost portion of the first leg 200 along the Z-axis direction.

The second leg 300 can extend from the chuck 120 and can define a proximal end 303 proximate to the chuck 120 and a distal end 304 distal from the chuck 120. More specifically, the second leg 300 can comprise a first portion 310 extending from the chuck 120 and a second portion 320 extending from and joined to the first portion 310. The first portion 310 and the second portion 320 can together form a main portion of the second leg 300. In some aspects, as shown, either of the first portion 310 and the second portion 320 can be straight when viewed from the end of the clip 100 and along the X-axis direction. More specifically, the first portion 310 can be tapered such that a portion proximate to the chuck 120 can be wider than a portion distal from the chuck 120. In some aspects, either of the first portion 310 and the second portion 320 can be curved when viewed from the end of the clip 100 and along the X-axis direction. The second leg 300 can comprise a third portion 330, which can extend from the main portion of the second leg 300 and, more specifically, from the second portion 320 of the second leg 300—and from the distal end 304 of the second leg 300. The third portion 230 can comprise a barb 350, which can extend outward from the centerline axis 101 of the clip 100.

In some aspects, when viewed from at least one direction such as the front, i.e., along at least the X-axis direction, the barb 350 can taper from a base 352—where it can extend from the second portion 320 of the second leg 300—to a tip 354. In some aspects, when viewed similarly, the barb 350 can define a constant thickness from the base 352 to the tip 354. The barb 350 of the second leg 300 can define an end surface 355 at the tip 354, portions of which can be rounded or flat. The second leg 300 can define a front end or first end 305 and a rear end or second end 306 (shown in FIG. 4). The second leg 300 can further define an inner surface 321 (shown in FIG. 1B) and an outer surface 322, which can be parallel to each other and can extend in the X-axis direction of the clip 100. Each of the inner surface 321 and the outer surface 322 can terminate at the distal end 304, which can be an outermost portion of the second leg 300 along the Z-axis direction.

The second portion 220 and, more generally, the main portion of the first leg 200 can define a recessed portion 240. The recessed portion 240 can be defined on the first end 205 of the first leg 200. In some aspects, the end on which the recessed portion 240 is defined in the first leg 200 (e.g., the first end 205) can face an end of the second leg 300 on which a recessed portion 340 is defined. In some aspects, the recessed portion 240 and the recessed portion 340 can face in opposite X-axis directions. The recessed portion 240 can define a first portion 242, which can be angled with respect to the inner surface 221 and, more specifically, can be angled at 90 degrees with respect to the inner surface 221. The recessed portion 240 can further define a second portion 244, which can be angled with respect to the first portion 242. The angle between the first portion 242 and the second portion 244 can be greater than 90 degrees and less than 180 degrees.

The first leg 200 and, more specifically, a portion of either the second portion 220 or the third portion 230 proximate to the distal end 204 and/or an intersection between the second portion 220 and the third portion 230 can define a tool engagement shoulder 232 (shown in FIG. 1B). The tool engagement shoulder 232 can comprise one or more surfaces such as, for example and without limitation, a flat surface or a curved surface against which a tool 1200 (shown in FIG. 12) can engage. In some aspects, the tool engagement shoulder 232 can be aligned with or parallel to the centerline axis 101 of the clip 100. In some aspects, the tool engagement shoulder 232 can be angled with respect to the centerline axis 101 of the clip 100.

Similarly, the second leg 300 and, more specifically, a portion of either the second portion 320 or the third portion 330 proximate to the distal end 304 and/or an intersection between the second portion 320 and the third portion 330 can define a tool engagement shoulder 332 (shown in FIG. 1A). The tool engagement shoulder 332 can comprise one or more surfaces such as, for example and without limitation, a flat surface or a curved surface against which the tool 1200 (shown in FIG. 12) can engage. In some aspects, the tool engagement shoulder 332 can be aligned with or parallel to the centerline axis 101 of the clip 100. In some aspects, the tool engagement shoulder 332 can be angled with respect to the centerline axis 101 of the clip 100. In some aspects, the tool engagement shoulders 232, 332 or orientations thereof can be mirrored structures of each other with respect to the centerline axis 101. The tool engagement shoulder 232 of the first leg 200 and the tool engagement shoulder 332 of the second leg 300 can be configured to simultaneously engage with the tool 1200 during removal of the clip 100 from the base 1010 (e.g., a foam cushion) and thereby be brought closer together by the tool 1200 during such removal.

As shown in FIG. 1B, the second portion 320 and, more generally, the main portion of the second leg 300 of the clip 100 can define the recessed portion 340. The recessed portion 340 can be defined on the second end 306 of the second leg 300. More specifically, as described above, the end on which the recessed portion 340 is defined in the second leg 300 (e.g., the second end 306) can face an end of the first leg 200 on which a recessed portion 240 is defined. The recessed portion 340 can define a first portion 342, which can be angled with respect to the inner surface 321 and, more specifically, can be angled at 90 degrees with respect to the inner surface 321. The recessed portion 340 can further define a second portion 344, which can be angled with respect to the first portion 342. The angle between the first portion 342 and the second portion 344 can be greater than 90 degrees and less than 180 degrees. In some aspects, as shown, the recessed portion 340 of the second leg 300 and, similarly, the recessed portion 240 of the first leg 200 can be defined by flat surfaces—either in cross-section or across the feature. In some aspects, the recessed portion 340 of the second leg 300 and, similarly, the recessed portion 240 of the first leg 200 can be defined, at least in part, by a curved surface.

Figure 2:
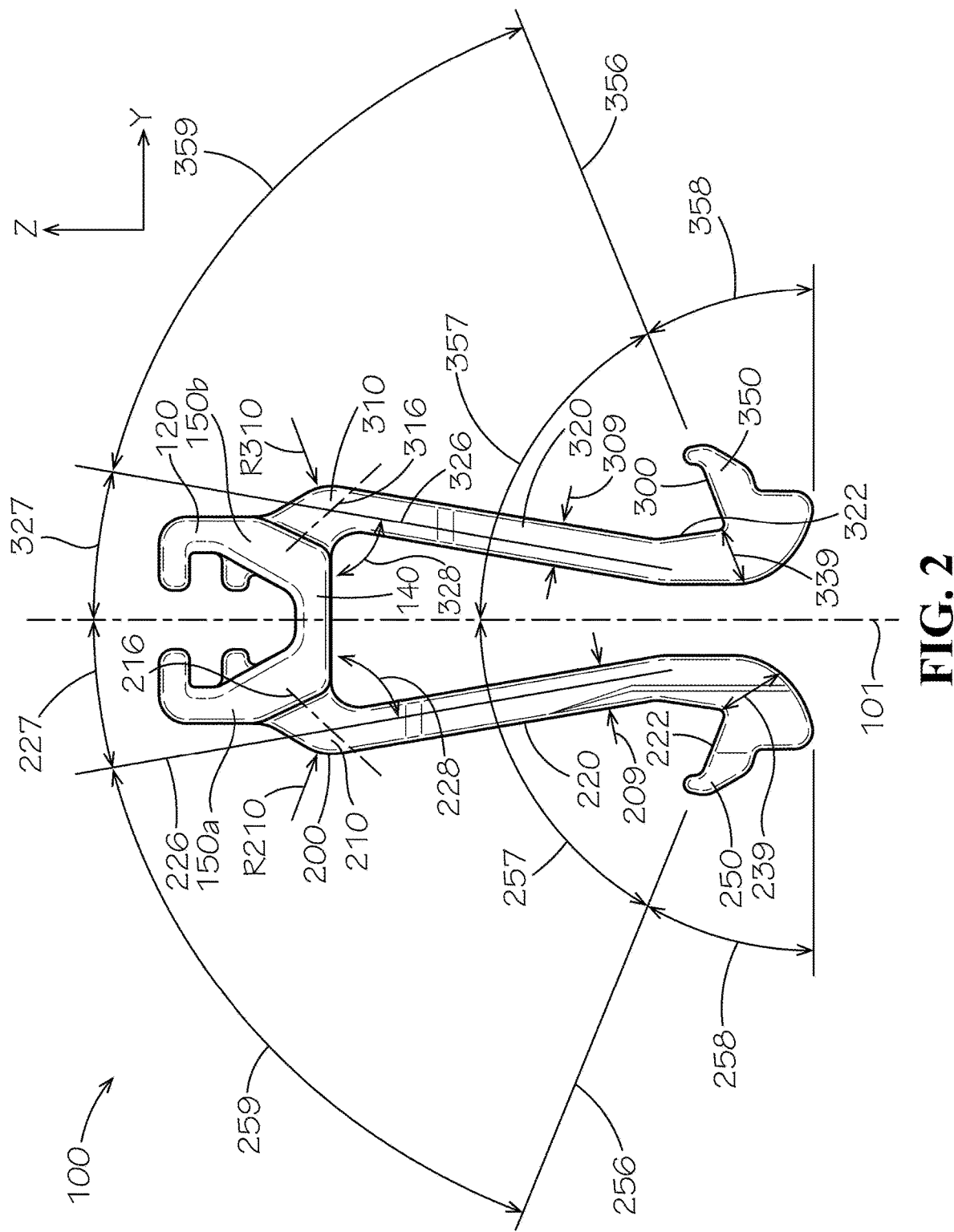
FIG. 2 is an end view or front view of the clip of FIG. 1.

FIG. 2 is an end view or front view of the clip 100. The chuck walls 150a,b can be angled with respect to the chuck base 140 of the chuck 120. To match the shape of the suspender 700 (shown in FIG. 7), an angled portion of the chuck walls 150a,b can be angled with respect to the centerline axis 101, and a vertical portion of the chuck walls 150a,b can be parallel to the centerline axis 101. As shown clearly in FIG. 2, the first leg 200 can extend from the angled portion of the chuck wall 150a, and the second leg 300 can extend from the angled portion of the chuck wall 150b.

The first portion 210 of the first leg 200 can define an outside radius R210 and/or an inner radius (shown but not labeled), which can facilitate bending of the second portion 220 with respect to the first portion 210. The first portion 210 can extend from the chuck wall 150a or from the chuck base 140 or from an intersection of the chuck wall 150a and the chuck base 140. The second portion 220 can be straight or comprise a straight section extending downwardly from the first portion 210. Where the first portion 210 attaches to the chuck 120, a centerline 216 of the first portion 210 can be angled with respect to adjacent surfaces of the chuck 120.

The second portion 220 of the first leg 200 can be angled with respect to the first portion 210 of the first leg 200. More specifically, a centerline 226 of the second portion 220 can be angled with respect to the centerline axis 101 by a leg angle 227 and can be angled with respect to an outer surface of the chuck base 140 by a leg angle 228. A reference datum line 256 of the barb 250, which can be defined by a portion of the outer surface 222 defining the barb 250, can be angled with respect to the centerline axis 101 by an angle 257, with respect to a horizontal orientation or the Y-axis direction by an angle 258, and with respect to the centerline 226 of the second portion 220 by an angle 259. Each of the angles referenced including the leg angles 227, 228 and the angles 257, 258, 259 but especially the leg angle 228 can be acute angles, i.e., angles measuring less than 90 degrees.

Similarly, the first portion 310 of the second leg 300 can define an outside radius R310 and/or an inner radius (shown but not labeled), which can facilitate bending of the second portion 320 with respect to the first portion 310. The first portion 310 can extend from the chuck wall 150b or from the chuck base 140 or from an intersection of the chuck wall 150b and the chuck base 140. The second portion 320 can be straight or comprise a straight section extending downwardly from the first portion 310. Where the first portion 310 attaches to the chuck 120, a centerline 316 of the first portion 310 can be angled with respect to adjacent surfaces of the chuck 120. The second portion 320 of the second leg 300 can be angled with respect to the first portion 310 of the second leg 300. More specifically, a centerline 326 of the second portion 320 can be angled with respect to the centerline axis 101 by a leg angle 327 and can be angled with respect to an outer surface of the chuck base 140 by a leg angle 328. A reference datum line 356 of the barb 350, which can be defined by a portion of the outer surface 322 defining the barb 350, can be angled with respect to the centerline axis 101 by a barb angle 357, with respect to a horizontal orientation or the Y-axis direction by a barb angle 358, and with respect to the centerline 326 of the second portion 320 by a barb angle 359. Each of the angles referenced, including the leg angles 327, 328 and the barb angles 357, 358, 359 but especially the leg angle 328 can be acute angles. Each reference datum line 256, 356 can be defined by a tangent line of a corresponding inside barb shoulder 954 nearest to the respective tip 254, 354 but not including the tip 254, 354 itself when viewed along the X-axis direction.

The leg angle 328 can be equal to the leg angle 228. In some aspects, the barb angles 258, 358 specifically can measure at least 20 degrees. In various aspects, the barb angles 258, 358 can measure another non-zero angle. In some aspects, as described above, each of the aforementioned angles are described in reference to a centerline or other datum line, as noted, of various structural elements. In other aspects, the same descriptions can be true with the angles as measured to either opposing surface of the structural elements.

A leg thickness 309 of the second leg 300 can be equal to a leg thickness 209 of the first leg 200. Furthermore, to increase rigidity and strength or for other reasons, a portion of either or both of the legs 200, 300 can define a different leg thickness 209, 309, or the respective leg thicknesses of the legs 200, 300 can otherwise vary. For example, a thickness 239—measured along a direction in the Y-Z plane extending between the inner surface 221 and the outer surface 222 can be greater than the leg thickness 209. Similarly, a thickness 339—measured along a direction in the Y-Z plane extending between the inner surface 321 and the outer surface 322 can be greater than the leg thickness 309.

FIG. 3 is a first side view of the clip 100, and FIG. 4 is a second side view of the clip 100. The first leg 200 can define a primary width 207 measured from the first end 205 to the second end 206. The third portion 230 of the first leg 200 can define a secondary width 237 similarly measured from the first end 205 to the second end 206. As shown, the secondary width 237 can be wider than or greater than the primary width 207 of the first leg 200. In some aspects, as shown, the secondary width 237 of the third portion 230 of the first leg 200 can be less than a width 127 of the chuck 120. In other aspects, the secondary width 237 can be equal to or greater than half of the width 127. Also as shown, the width 127 of the chuck 120 can be equal to or greater than the primary width 207 of the second portion 220 of the first leg 200.

As shown in FIG. 4, the second leg 300 can define a primary width 307 measured from the first end 305 to the second end 306. The third portion 330 of the second leg 300 can define a secondary width 337 similarly measured from the first end 305 to the second end 306. As shown, the secondary width 337 can be wider than or greater than the primary width 307 of the second leg 300. In some aspects, as shown, the secondary width 337 of the third portion 330 of the second leg 300 can be less than the width 127 of the chuck 120. In other aspects, the secondary width 337 can be equal to or greater than half of the width 127. Also as shown, the width 127 of the chuck 120 can be equal to or greater than the primary width 307 of the second portion 320 of the second leg 300.

As shown, the first leg 200 and the second leg 300 can be at least partially offset from each other in the X-axis direction. As will be described with respect to the descriptions of centerlines 201, 301 and centerlines 202, 302 in FIGS. 5 and 6, the legs 200, 300 or portions thereof can be located in different Y-Z planes and thereby offset from each other in the X-axis direction. The legs 200, 300 can define the respective centerlines 201, 301 proximate to the chuck 120. The legs 200, 300 and, more specifically, the third portions 230, 330 can define the respective centerlines 202, 302 at the distal ends 204, 304 (shown in FIG. 1A). As shown by the shape of each of the legs when viewed along the Y-axis direction in FIGS. 3 and 4, the legs 200, 300 and, more specifically, the second portions 220, 320 thereof can extend in a direction angled with respect to the centerline axis 101 in opposite X-axis directions such that the centerlines 201, 301 of the legs 200, 300 are aligned with a centerline axis 101 of the clip 100 at the chuck 120 but offset from each other distal from the chuck 120, i.e., at the distal ends 204, 304. More specifically, as shown, portions of the legs 200, 300 or centerlines thereof can be offset by an amount greater than the total leg offset distance 602.

Figure 5:
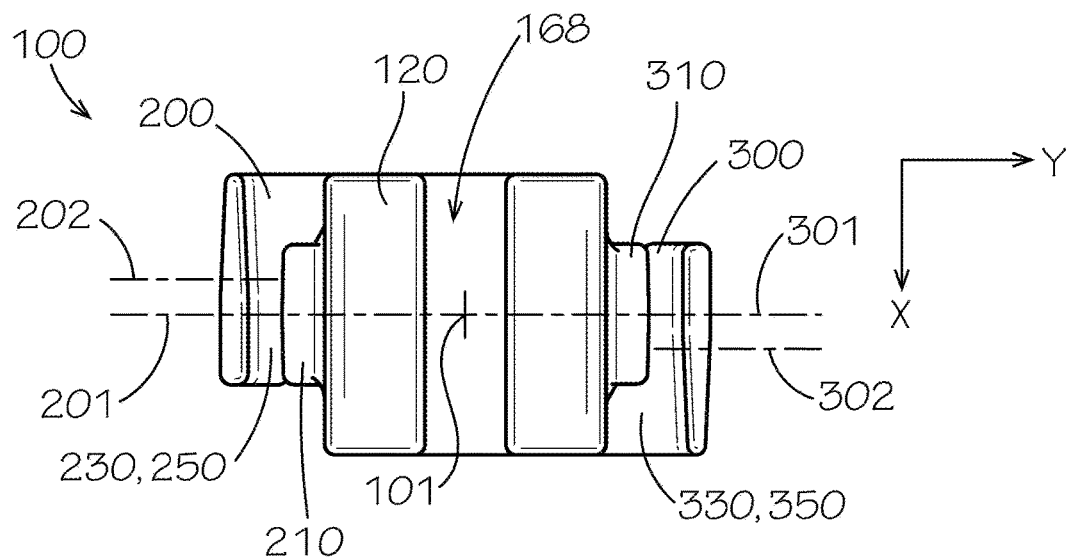
FIG. 5 is a top plan view of the clip of FIG. 1.
Figure 6:
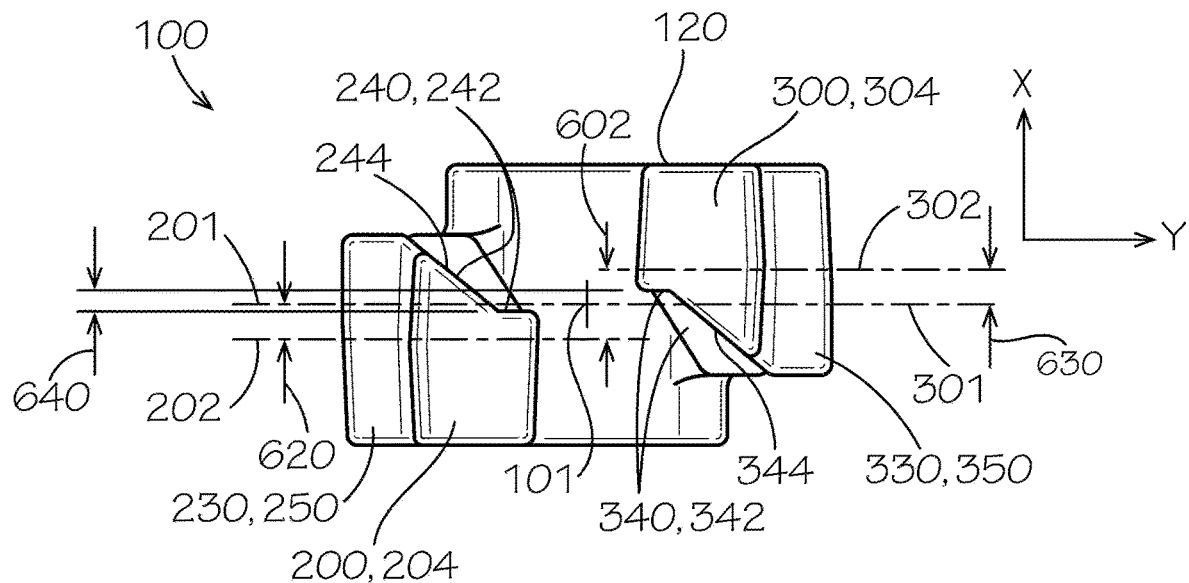
FIG. 6 is a bottom plan view of the clip of FIG. 1.

FIG. 5 is a top plan view of the clip 100, and FIG. 6 is a bottom plan view of the clip 100. As shown, the centerline 201 of the first leg 200 and the centerline 301 of the second leg 300 can intersect the centerline axis 101 of the clip 100, which can define a centerline of the chuck 120. As also shown, the centerline 202 of the third portion 230 and, more specifically, the barb 250 of the first leg 200 can be offset in the X-axis direction from the centerline axis 101 of the clip 100. Similarly, the centerline 302 of the third portion 330 and, more specifically, the barb 350 of the second leg 300 can be offset in the X-axis direction from the centerline axis 101 of the clip 100. As shown, the centerlines 202, 302 can be offset in opposite directions (e.g., on opposite sides of the centerlines 201, 302). Moreover, in some aspects, the clip 100 as viewed can have rotational symmetry, at least when any draft angles are disregarded, such that the first leg 200, when rotated about the centerline axis 101, matches the shape, position, and orientation of the second leg 300. In some aspects, at least a portion of the clip 100 can have or exhibit plane symmetry about a plane equidistant to the structures having such symmetry such as, for example and without limitation, the legs 200, 300 proximate to where they attach to the chuck 120. Such a plane can intersect the centerline axis 101. In some aspects, at least a portion of the clip 100 can have or exhibit point symmetry about a point equidistant to the structures having such symmetry such as, for example and without limitation, the barbs 250, 350. Such a point can lie on the centerline axis 101. As shown in various figures including FIGS. 5 and 6, the clip 100 can define tapered or drafted surfaces in one or more of the X-axis, Y-axis, or Z-axis (shown in FIG. 1) directions to facilitate manufacturing such as by a process of injection molding of the clip 100, which can be aided by the incorporation of draft angles.

As shown in FIG. 6, a total leg offset distance 602—measured in an X-axis direction of the clip 100 between the centerline 202 of the barb 250 of the first leg 200 and the centerline 302 of the barb 350 of the second leg 300—can be equal to or less than the secondary widths 237, 337 of the respective legs 200, 300 in the X-axis direction. In some aspects, as also shown, respective leg offset distances 620, 630 can be less than half of either of the secondary widths 237, 337 of the respective legs 200, 300 in the X-axis direction. More specifically, to reduce any tendency of the clip 100 to rotate during assembly into a base 1010 (shown in FIG. 10), the total leg offset distance 602 and the leg offset distances 620, 630 can be minimized and even further reduced. In some aspects, the total leg offset distance 602 can be less than half of either of the secondary widths 237, 337. In some aspects, each of the first leg 200 and the second leg 300 are configured to increase the total leg offset distance 602 when the first leg 200 and the second leg 300 are in contact with and moving past each other in the Y-axis direction. By reducing the aforementioned offset distances—to within the ranges shown, for example—the clip 100 can be more easily installed into a hole 1080 defined in the base 1010 without applying any countering moment to prevent rotation of the clip 100 about a direction of insertion of the clip 100. With some designs previously considered, a countering moment is required or even not sufficient to prevent such rotation of the clip 100 during assembly.

Figure 9:
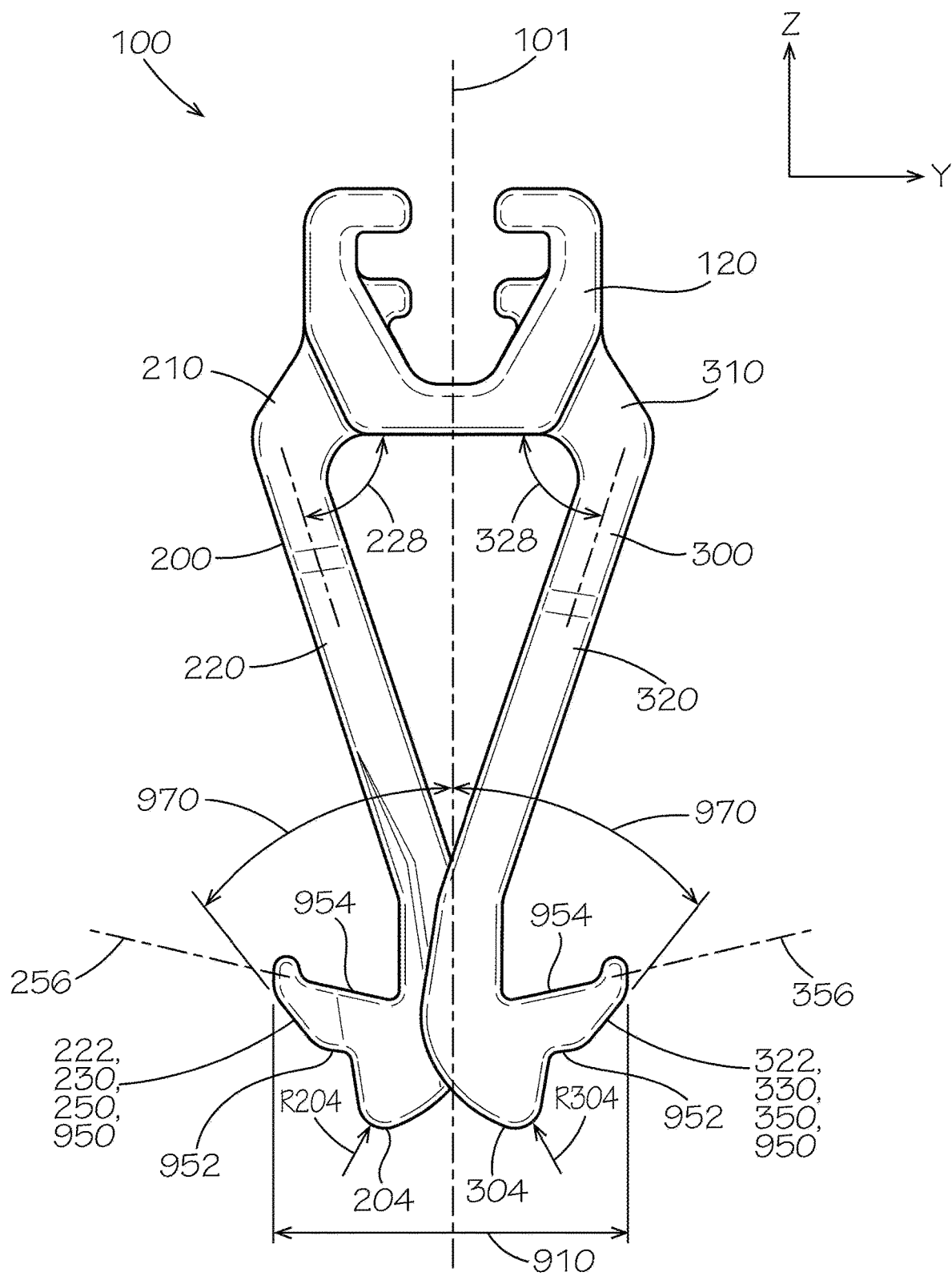
FIG. 9 is an end view of the clip of FIG. 1 with two legs thereof bent inwards towards each other.

The first portions 242, 342 of the respective recessed portions 240, 340 of the legs 200, 300 can be parallel to each other and, optionally, also offset from each other in the X-axis direction by a clearance gap 640. Likewise, the second portions 244, 344 of the respective recessed portions 240, 340 of the legs 200, 300 can be parallel to each other. Either of the parallel arrangement of the first portions 242, 342 and the clearance gap 640—and both features together—can result in an initial force required to pass the legs 200, 300 past each other in a nesting arrangement (for example, as shown in FIG. 9) being low—as low as the force required to simply bend the legs 200, 300. In other words, cross of the legs 200, 300 need not, at least initially, create any additional resistance to bending of the legs 200, 300. As soon as the legs 200, 300 contact each other—more specifically, as soon as the first leg 200 contacts the second portion 344 of the second leg 300 and the second leg 300 contacts the second portion 244 of the first leg 200—the force can be higher to prevent overbending of the legs 200, 300, to encourage spring-back of the legs 200, 300 to their original position after bending, or other reasons. More specifically, a length and angle of the first portions 242, 342 or the second portions 244, 344 of the respective recessed portions 240, 340 can be adjusted to allow more or less maximum bending or resistance to bending of the legs 200, 300.

Figure 7:
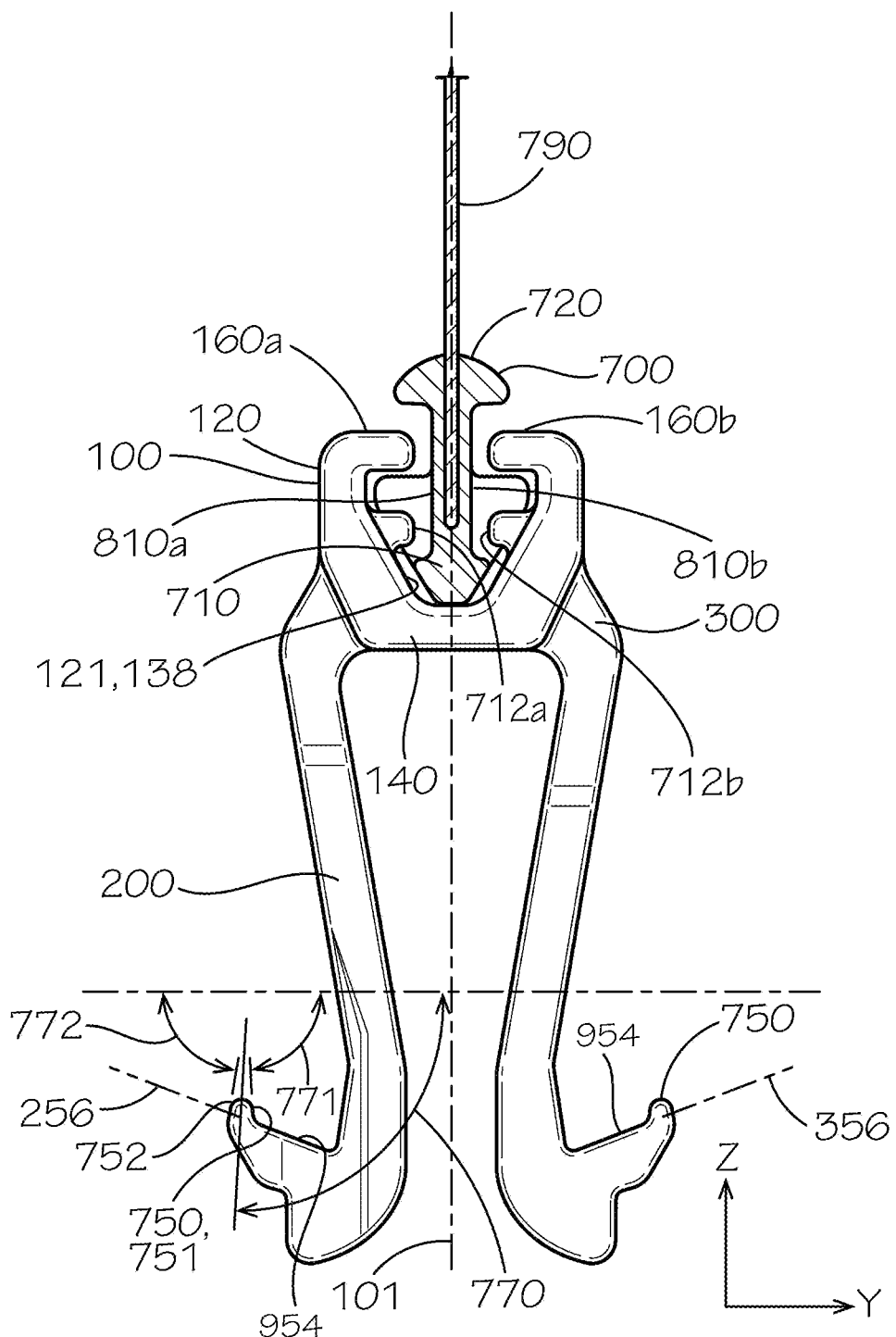
FIG. 7 is a partial sectional end view of the clip of FIG. 1 with a suspender assembled therein, taken from line 7-7 of FIG. 8 and with only the suspender shown in cross-section.

FIG. 7 is a partial sectional end view of the clip 100 with the suspender 700 assembled therein. The suspender 700 can be, for example and without limitation, a suspender like that available as part of an EZ-CLIP® fastening product from YKK Corporation, which is attached to an upholstery cover. The chuck 120 of the clip 100 can flex or deform between an unbent or unflexed condition (as shown) and a bent or flexed condition (not shown). This flexing can occur due to outward forces exerted by the suspender 700 on the retaining flanges 160a,b of the chuck 120 during assembly of the suspender 700 with the clip 100. More specifically, the clip 100 can open up or increase a size of the gap 168 (shown in FIG. 1) to allow passage and insertion of the suspender 700. A tapered body 710 of the suspender 700 and side surfaces defined thereby can push against the retaining flanges 160a,b and specifically against the innermost edges, which can be chamfered or rounded. As shown, the body 710 of the suspender 700 can be received within the suspender retention cavity 138 and, once so received, can be kept in contact with the retaining flanges 160a,b by the chuck base 140 of the chuck 120. A flange 720 of the suspender 700 can ease insertion of the suspender 700 into the chuck 120 by providing a surface on either side of a tape 790 of the suspender 700 against which an assembly technician or other user of the clip 100 can more easily push the suspender 700 into the clip 100. An installation or assembly direction of the suspender 700 can be aligned with the centerline axis 101 of the clip 100.

Again, as shown, the tabs 712a,b can extend from the inner surface 121 of the chuck 120. The tabs 712a,b can be sized and otherwise configured to engage any one of a plurality of recessed portions 810a,b of the suspender 700, thereby fixing a lateral position (i.e., in the X-axis direction shown in FIG. 1) of the suspender 700 with respect to the clip 100.

Figure 10:
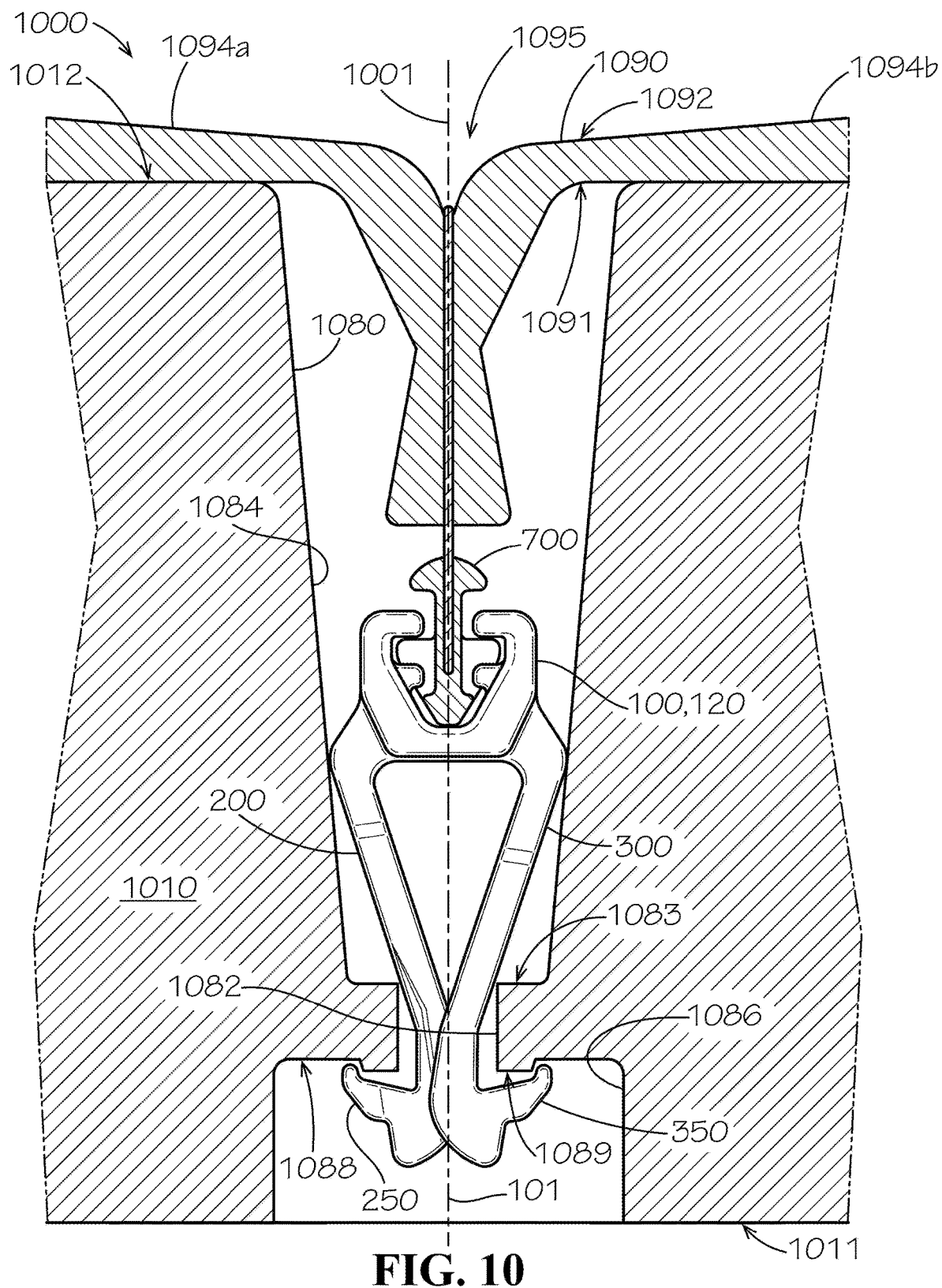
FIG. 10 is an end view of an assembly comprising the clip of FIG. 1 and a base of a seat showing the assembly after installation of the clip into the base and taken from line 10-10 of FIG. 11.

Each of the tips 254, 354 of the respective barbs 250, 350 of the respective legs 200, 300 can define an upturned protrusion 750, which can be a "nail" or claw (and, more generally, a securing feature), for improved tension or pull-out strength (i.e., resistance against the clip 100 pulling out of the base 1010 shown in FIG. 10). Each protrusion 750 of the barbs 250, 350 can define an inner or first side surface 751 and an outer or second side surface 752. More specifically, in some aspects, the first side surface 751 and the second side surface 752 can extend from or past the reference datum lines 256, 356. In some aspects, the tip 254, 354 of each of the first barb 250 of the first leg 200 and the second barb 350 of the second leg 300 can extend past the corresponding inside barb shoulder 954 in a Z-axis direction of the clip 100. In some aspects, the protrusion 750 and a tip orientation angle 770 defined thereby can be angled with respect to a remaining portion of the corresponding barb 250, 350 and/or the reference datum lines 256, 356.

In some aspects, in either or both of an unflexed and flexed conditions of the legs 200, 300, a tangent line to each of first side surface 751 and the second side surface 752 with respect to a Y-axis direction of the clip can be angled at respective surface orientation angles 771, 772, each of which can measure 90 degrees or less. Meanwhile, a centerline of the protrusion 750 or a bisector of the two tangent lines can define the tip orientation angle 770, which can measure 90 degrees or more. By so defining the surfaces 751, 752, the pull-out strength can be increased because the tips 254, 354 and, more specifically, the protrusions 750, will less easily slide along a surface of the base 1010 against which they contact because of increased friction.

Friction is, generally speaking, a function of the force acting between two surfaces in contact with each other and the characteristics of those surfaces and their connection, which can be captured or characterized by a coefficient of friction. As disclosed herein, because of the pointed shape and orientation of each of the protrusions 750 of the tips 254, 354, any force tending to pull out the clip 100 can naturally be made to act on a relatively small area, which can be defined by the surface of the protrusions 750 in contact with the base 1010. More specifically, the pull-out force can be concentrated and therefore higher at the protrusions 750 instead of being spread out across a large area and therefore lower at the tips 254, 354 defining smaller or no protrusions 750. The shape of the protrusions 750 can naturally result in a higher coefficient of friction as well. While each of the protrusions 750 defines each tip 254, 354 as radiused, the actual clip 100 can be much smaller than as shown scaled up in the figures (for example, each of the protrusions 750 can be less than one millimeter in width and in height), and the radii can be incorporated to facilitate manufacturability. As disclosed herein, therefore, the tips 254, 354 can define a relatively small area across which any pull-out force is applied.

Figure 8:
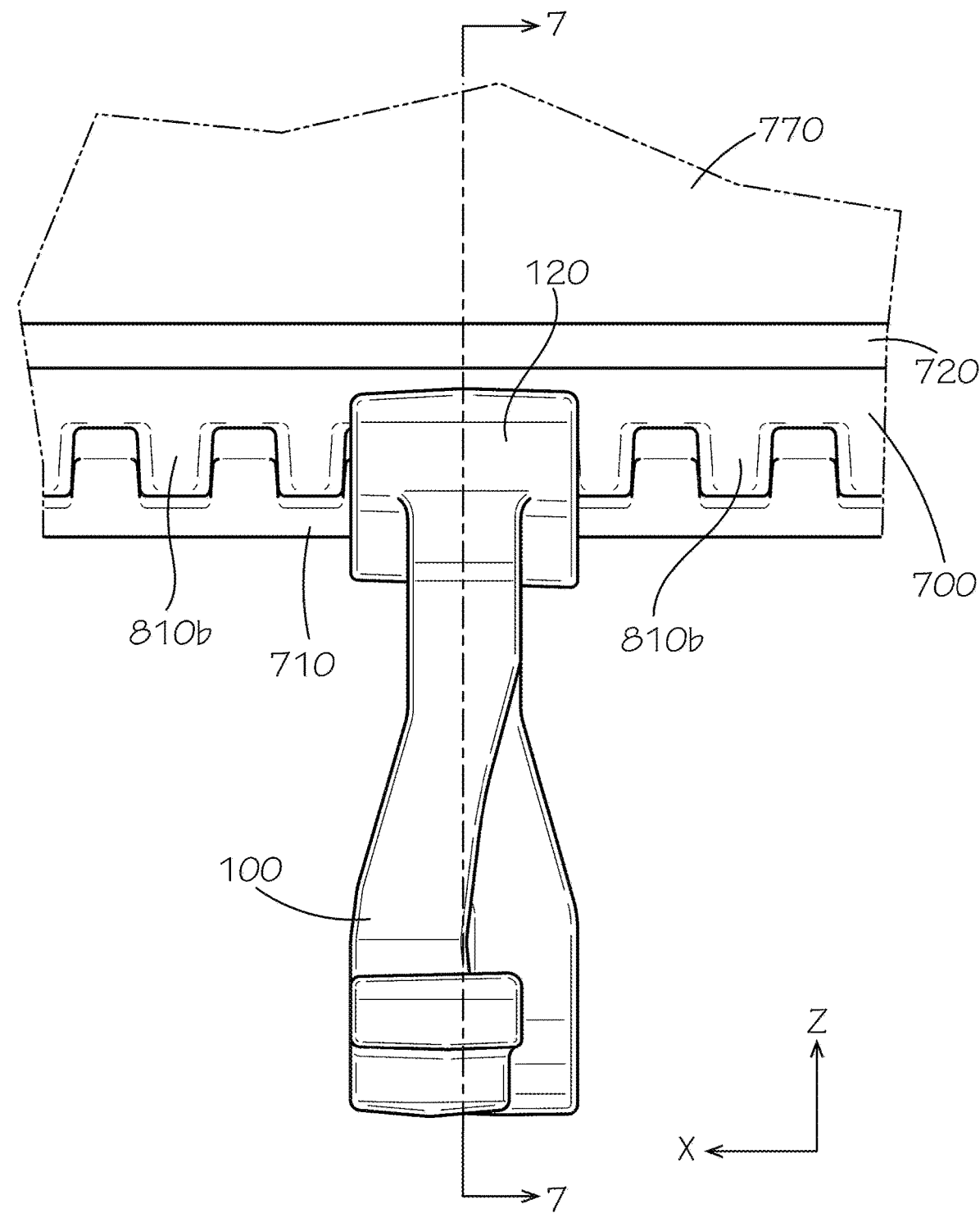
FIG. 8 is a side view of the clip and the suspender of FIG. 7.

FIG. 8 is a side view of an assembly of the clip 100 and the suspender 700 showing the suspender locked in the X-axis, Y-axis (shown in FIG. 7), and Z-axis directions inside the suspender retention cavity 138 (shown in FIG. 7) of the chuck 120. Because any one of a plurality of the recessed portions 810a,b (810a shown in FIG. 7) can be engaged with the tabs 712a,b (both shown in FIG. 7), the lateral position of the suspender 700 in the clip 100 can be set as desired. As soon as the suspender 700 is inserted into the chuck 120 of the clip 100, the suspender 700 can be "locked" or fixed in that position with respect to the clip 100.

FIG. 9 is an end view of the clip 100 of FIG. 1 with the two legs 200, 300 thereof bent inwards in the Y-axis direction towards each other, i.e., in the flexed condition. When a force applied to the clip 100 during installation or removal causes the clip 100 to change from the unflexed condition to the flexed condition, the bending of the legs 200, 300 towards each other can allow the clip 100 to pass through a hole 1080 (shown in FIG. 10) or a portion thereof in the base 1010 (shown in FIG. 10). The first leg 200 and the second leg 300 can be configured to bend equally during installation of the clip 100. The first portions 210, 310 of the respective legs 200, 300 can function as hinge points about which the second portions 220, 320 and other portions can rotate, and in the process the corresponding leg angles 228, 328 can decrease. An overall width 910 of the clip 100 as measured at the legs 200, 300 can be decreased by pushing the clip 100 into the hole 1080 or by otherwise bending the legs 200, 300 towards each other.

A portion 950 of each of the outer surfaces 222, 322 of the respective legs 200, 300 can be angled with respect to the centerline axis 101 by an angle 970, which can be an acute angle and can thereby facilitate insertion of the clip 100 in the hole 1080. Furthermore, the distal ends 204, 304 of the respective legs 200, 300 can define respective radii R204, R304, which can facilitate insertion of the clip 100 in the hole 1080. An outside barb shoulder 952 can extend from and be angled with respect to the tool engagement shoulders 232, 332 (232 shown in FIG. 1B, 332 shown in FIG. 1A).

Similarly, an inside barb shoulder 954 can extend from and be angled with respect to the corresponding second portion 220, 320 of the respective legs 200, 300. The outside barb shoulder 952 of each leg 200, 300 can stop movement of the tool 1200 (shown in FIG. 12) with respect to the clip 100 along the centerline axis 101 during removal of the clip 100 and help ensure that the tool 1200 remains engaged with the tool engagement shoulders 232, 332 at such a time. In some aspects, each of the barb shoulders 952, 954 of the respective legs 200, 300 can also be angled with respect to the centerline axis 101.

Figure 11:
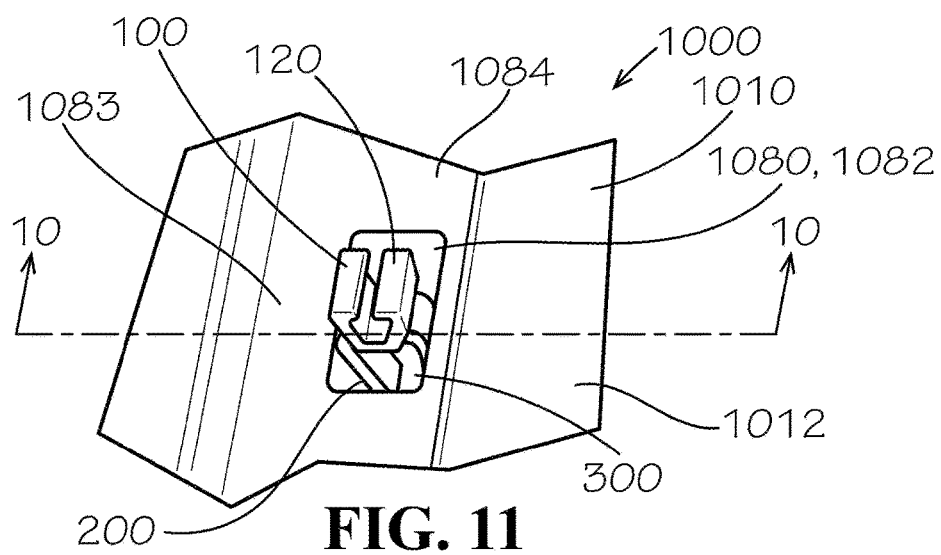
FIG. 11 is a top perspective view of the clip and the base of FIG. 10 after installation of the clip into the base.

FIG. 10 is an end view of an assembly 1000 comprising the clip 100 and a cover 1090 assembled to the base 1010 and taken from line 10-10 of FIG. 11. The clip 100 and, more specifically, the legs 200, 300 are shown in the flexed condition to more clearly show the structure of the base 1010 and to reflect the geometry of the clip as it passes through the intermediate portion 1082 of the hole e1080. After installation of the clip 100, however, the clip 100 can return to the unflexed position, which can cause deformation of some portion of the hole 1080 and more securely lock the clip 100 in place. The base 1010 can be or can comprise, for example and without limitation, a cushion such as a seat bottom cushion of a vehicle seat or a seat back cushion of the vehicle seat, after installation of the clip 100 into the base 1010. The base 1010 can comprise a body defining a lower surface or first surface 1011 and an upper surface or second surface 1012 and further defining one or more holes 1080 extending from the lower surface 1011 to the upper surface 1012. In some aspects, as shown, an intermediate portion 1082 of each hole 1080 defined in the base 1010 can have a smaller width or diameter than an upper portion or first portion 1084 of the same hole 1080 defined in the upper surface 1012 or a lower portion or second portion 1086 of the same hole 1080 defined in the lower surface 1011. In various aspects, the hole 1080 can be square or circular or some other shape to accommodate one shape or another of the clip 100. In some aspects, as shown, the first portion 1084 can be a trench extending between multiple holes 1080 and allowing an extended length of the suspender 700 to be received therein. Any portion of the hole 1080 such as the two sides of the first portion 1084 shown can be sloping, i.e., angled with respect to the central axis 1001, which can result in a bottom end of the first portion 1084 being smaller in at least one dimension than a top end of the first portion 1084.

A step or variation in width or diameter between the intermediate portion 1082 and at least the first portion 1084 of the hole 1080 can provide or define a step surface or shoulder surface 1083. A step or variation in width or diameter between the intermediate portion 1082 and at least the second portion 1086 of the hole 1080 can provide or define a shoulder surface 1088 against which the barbs 250, 350 of the respective legs 200, 300 of the clip 100 can catch and hold and thereby positively maintain the position of the clip 100 after assembly. More specifically, the shoulder surface 1088 can comprise or define a raised portion 1089, which can specifically engage and further discourage movement of the tips 254, 354 of the barbs 250, 350. A force pushing down on the top of the clip 100 and/or the suspender 700 and/or the cover 1090 by, for example and without limitation, a tool or a finger of an operator can push the clip 100 through the hole 1080. The centerline axis 101 of the clip 100 can be aligned with the central axis 1001 of the base 1010 during any point in the assembly process and even throughout the assembly process.

A plurality of clips 100 can be attached to the suspender 700 at desired locations before installation of the clip 100—or clips 100—into the base 1010. The suspender 700 can be secured to the cover 1090 with, for example and without limitation, one or more sewn joints, which can define one or more seams 1095. The cover 1090 can be a seat cover and can be made from any one of number of flexible materials such as, for example and without limitation, natural or synthetic fabric or leather. The cover 1090 can define an inner surface 1091, which can face toward the base 1010, and an outer surface 1092, which can face away from or in a direction opposite from the base 1010. The cover 1090 can be formed from or define individual panels 1094*a,b* and can be used to cover the base 1010.

Upon fastening of the cover 1090 through assembly of the suspender 700, especially with other instances of the clip 100 (in other holes not shown but spaced apart from the hole 1080 shown), the cover 1090 can, as desired, be made as taut or as tight against the upper surface 1012 and any other surface of the base 1010. In a final assembled condition of the assembly 1000, the base 1010 can be positioned at least in part between the cover 1090 and the barbs 250, 350 of the clip 100. More specifically, the clip centerline axis 101 can be aligned with the central axis 1001 and the legs 200, 300 of the clip 100 can press against an interior surface of the base 1010 such as the surface 1088 at the intermediate portion 1082 of the hole 1080. As shown, the barbs 250, 350 can prevent upward movement of the clip 100 even under the load effected by taut cover 1090. The presence of the suspender 700—and its extension in the X-axis direction on either side of the hole 1080 and, more specifically, the intermediate portion 1082—can prevent an opposite downward movement of the clip 100 through the hole 1080 and past the shoulder surface 1083 defined by the hole 1080. In some aspects, resistance to insertion of the clip 100 into the base 1010 can be overcome by the deformable nature of the base 1010 of the base 1010 and by continued use of an installation tool and/or additional pressure against the clip 100 by the operator.

In some aspects, as shown, either or both of the clip 100 and the base 1010 can define a monolithic component. In some aspects, the base 1010 specifically can comprise more than one layer or component sandwiched together. In some aspects, the base 1010 or a portion thereof can be formed from a deformable material (e.g., foam, whether soft or hard). In some aspects, the base 1010 or a portion thereof can be formed from a hard or rigid material such as, for example and without limitation, molded, extruded, stamped, and/or machined material comprising, for example and without limitation, metal, plastic, or a composite material. A portion of the body defining the lower surface 1011 can function as a backing plate, which can provide benefits such as, for example and without limitation, providing greater rigidity to the base 1010 or making it more difficult for the clip 100 to be pulled through the hole 1080. In some aspects, at least when the base 1010 comprises multiple layers or portions, each portion can be formed from a deformable material, or each portion can be formed from a hard or rigid material. The second portion 1086 of the hole 1080 can form a "blind" pocket (not shown and not visible when facing the lower surface 1011) instead of a through hole passing entirely through the base 1010.

FIG. 11 is a top perspective view of the assembly 1000 in accordance with another aspect of the current disclosure. More specifically, FIG. 11 shows the clip 100 and the base 1010 of FIG. 10 after installation of the clip 100 into the base 1010 and showing the chuck 120 extending above the shoulder surface 1083. The first portion 1084, shown as a trench, of the hole 1080 is shown wider and shallower than the first portion 1084 of the hole 1080 of FIG. 10.

Figure 12:
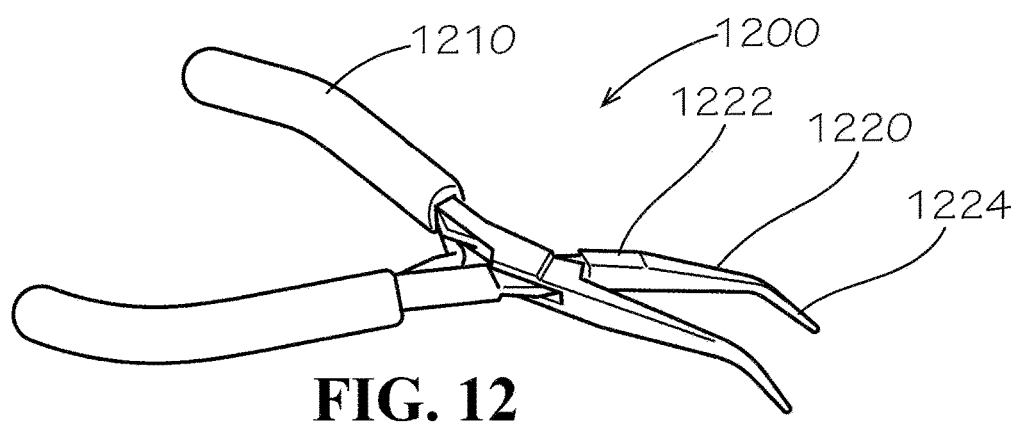
FIG. 12 is a top perspective view of a pair of bent-nose pliers for use in removing any of the clips disclosed herein including the clip of FIG. 10.

FIG. 12 is a top perspective view of a tool 1200, which can be a pair of pliers or, more specifically, bent-nose pliers as shown. The tool 1200 can comprise handles 1210 and jaws 1220. A tip portion 1224 of each of the jaws 1220 can be angled with respect to a base portion 1222 of the respective jaws 1220 to make it easier for the tool 1200 to be placed against the lower surface 1011 of the base 1010 and under the barbs 250, 350 of the clip 100 without the hand of an operator of the tool 1200 contacting the lower surface 1011.

Figure 13:
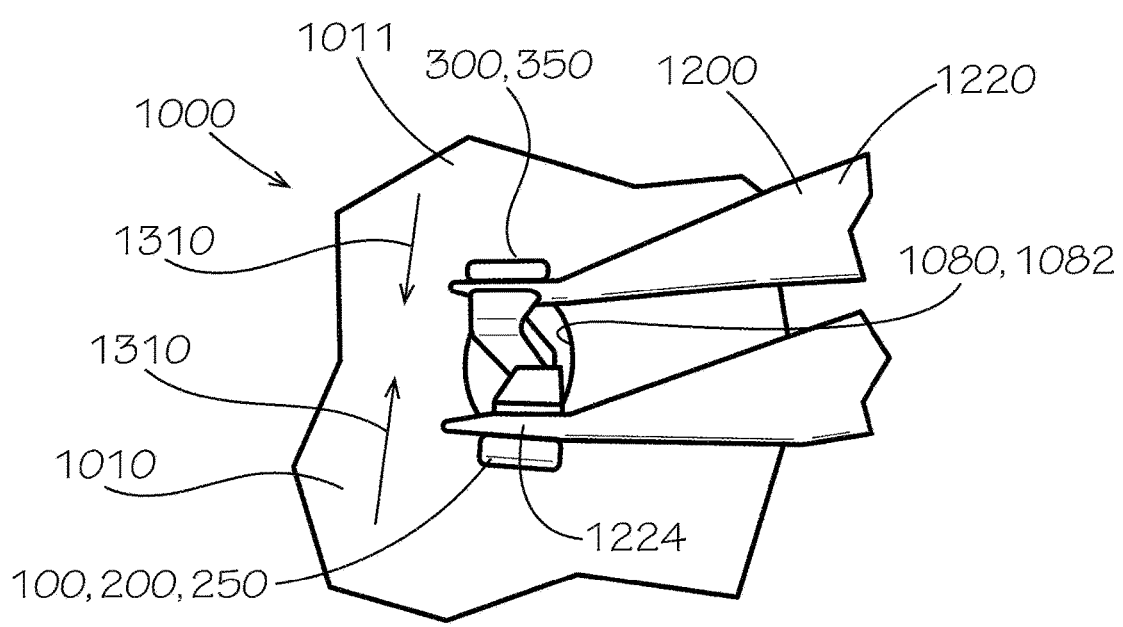
FIG. 13 is a bottom perspective view of an assembly of the base and the cover with the bent-nose pliers shown in the process of removing the clip of FIG. 10 from the base of FIG. 10.

FIG. 13 is a bottom perspective view of the assembly 1000 with the tool 1200 shown in the process of removing the clip 100 from the base 1010. As shown, the tip portion 1224 of each of the jaws 1220 of the tool 1200 can be positioned against the legs 200, 300 and, more specifically, the tool engagement shoulders 232, 332 (232 shown in FIG. 1B, 332 shown in FIG. 1A) and brought together in an inward movement 1310 of either or both of the barbs 250, 350 by squeezing the handles 1210 (shown in FIG. 12) until the barbs 250, 350 are brought close enough together to be able to pass through the hole 1080 and, in particular, the intermediate portion 1082 thereof.

In various aspects, a length of either or both of the legs 200, 300 as measured from its attachment point on the chuck 120 can be increased or decreased to increase or decrease the amount of flex of the legs 200, 300 or to facilitate use of the clip 100 in a thicker base 1010 (shown in FIG. 10) or, more specifically, in a base 1010 in which the intermediate portion 1082 (shown in FIG. 10) of the hole 1080 (shown in FIG. 10) is taller (or thicker) or shorter (or thinner). Generally speaking, variables affecting the flexibility of each of the legs 200, 300 can include a length thereof, the leg thickness 209, 309, and the primary width 207, 307.

While not explicitly shown, the assembly 1000 (shown in FIG. 10) can comprise any of multiple aspects of the clip 100 in position against the lower surface 1011 (shown in FIG. 10) or a portion of the hole 1080 defined in the base 1010 (shown in FIG. 10). In various aspects, any number of the clips 100 can be installed through the base 1010 to secure the cover 1090 (shown in FIG. 10). In some aspects, a certain number of clips 100 can be specified. In other aspects, a spacing between adjacent clips 100 in the X-axis direction and in the Y-axis direction can be specified. A greater number of the clips 100 and a smaller spacing between the adjacent clips 100 can in some aspects result in an improved appearance. In some aspects, for example and without limitation, a spacing between the clips 100 can be set at approximately 5 millimeters minimum or at least the overall width of the clip 100 in the X-axis direction. In some aspects, the spacing between the clips can be approximately 100 millimeters. In some aspects, any spacing that is physically possible can be used.

The clip 100 can be made of any one of a number of deformable materials able to elastically deform to the degree described including, for example and without limitation, engineered polymers. One example of an engineered polymer is polyoxymethylene (POM). The clip 100 can be formed by an injection molding process but could conceivably be made from other processes such as, for example and without limitation, by an extruding process and/or a machining process. The base 1010 itself can be made from any desirable material using a variety of processes, which can be a significant benefit of the clip 100 not depending on the material of the base 1010 but instead providing its own anchoring function.

Figure 14:
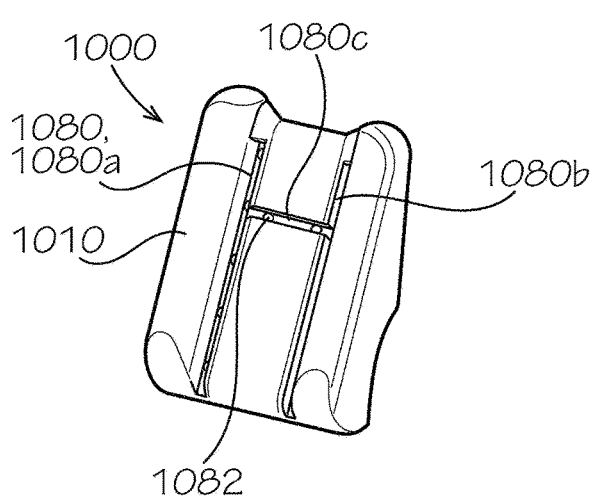
FIG. 14 is a front perspective view of a portion of the assembly of FIG. 10 including a base exemplarily structured as a seat back cushion in accordance with yet another aspect of the current disclosure.

FIG. 14 is a front perspective view of the assembly 1000 or at least a portion thereof including base 1010. The base 1010 is exemplarily structured as a seat back cushion of a vehicle in accordance with yet another aspect of the current disclosure. As shown, the base 1010 can define a plurality of holes 1080, each set of which can define a corresponding trench to hold the suspender 700 (shown in FIG. 10) and a plurality of intermediate portions 1082 to receive the clips 100. The holes 1080 can be oriented as desired in the base, including at intersections of surfaces or elsewhere where it may be beneficial to hold the cover 1090 (shown in FIG. 10) snug or tight to the base 1010. For example, the holes 1080 can comprise holes 1080*a,b,c*.

Figure 15:
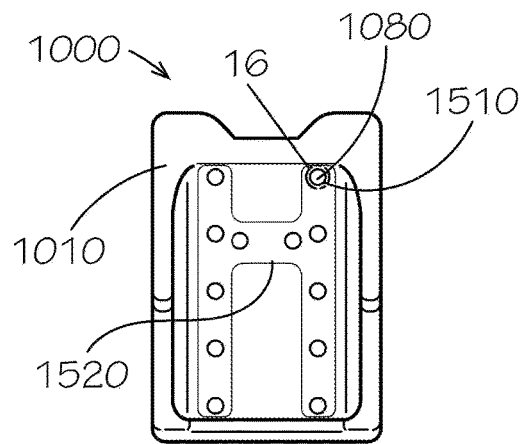
FIG. 15 is a rear view of a portion of the assembly of FIG. 14 comprising and shown facing a plurality of reinforcement rings installed in the base.

FIG. 15 is a rear view of the assembly of FIG. 14 including the base 1010. As shown, the base 1010 can comprise a plurality of reinforcement rings 1510. Each of the reinforcement rings 1510 can be a flanged bushing, a band, an annular body, a washer, a plate, a grommet, or another shape able to receive the clips 100 (shown in FIG. 16). The reinforcement rings 1510 can be formed from a solid material or can be formed into a solid material such as, for example and without limitation, through an injection molding process, in which case a variety of shapes can be used for the reinforcement rings 1510. In some aspects, whether stamped or molded, the reinforcement ring 1510 can comprise a wire or other cross-member extending across the reinforcement ring 1510 to help secure or prevent rotation of the clip 100. In some aspects, the reinforcement ring 1510 can define a recessed portion in an axial outer surface of the reinforcement ring 1510, in which case the barbs 250, 350 can be received within the recessed portion.

As shown, a panel 1520 can be positioned between the reinforcement rings 1510 and the base 1010, which itself can be formed into any desirable shape. The panel 1520, which can be an installation panel or backup panel, can comprise or be formed from any non-woven, woven, or knitted scrim fabric. As shown, a single panel 1520 can extend under and between a plurality of or, as desired, even all of the reinforcement rings 1510. At the same time, use of the panel 1520 can be minimized by limiting a size of the panel 1520. For example, the panel 1520 can extend only a limited distance from an edge or a center of each reinforcement ring 1510 and, as desired, between adjacent reinforcement rings 1510. In some aspects, the panel 1520 can result in a reduction or elimination of noises—such as squeaking noises, which in some aspects can otherwise become audible when an end user of the vehicle sits on a seat comprising the base 1010. Such noises can result, for example and without limitation, from contact between a surface of the base 1010 and a structure (not shown) supporting the base 1010 without the panel 1520 in between. In some aspects, the panel 1520 can reinforce the base 1010 so that during installation of the reinforcement rings 1510 or over time during use of an assembled product such as a seat comprising the assembly 1000 (shown in FIG. 10) the reinforcement rings 1510 do not pull through or otherwise deform a surface of the base 1010.

In some aspects, the panel 1520 or the reinforcement rings 1510 or both the panel 1520 and the reinforcement rings 1510 can be assembled in place before or during forming of the base 1010. For example and without limitation, the panel 1520 or the reinforcement rings 1510 can be positioned in a mold used to form the base 1010 and during the molding process can be formed as part of—and can be simultaneously assembled and even secured to—the base 1010. More specifically, the reinforcement rings 1510 can comprise a magnetic material such as, for example and without limitation, iron and can thereby be attracted to an inner surface of tooling during the molding process. In some aspects, the panel 1520 or the reinforcement rings 1510 or both the panel 1520 and the reinforcement rings 1510 can be assembled in place after forming of the base 1010. For example and without limitation, the panel 1520 can be positioned against or even secured against the base 1010 after molding thereof, although in some aspects it will be beneficial to pre-form holes 1680 (shown in FIG. 16) in the base 1010 or holes (not shown) in the panel 1520 or both the holes 1680 in the base 1010 and the holes in the panel 1520 to facilitate positioning of the panel 1520 and readily receive the reinforcement rings 1510 without further cutting or forming of the base 1010. The reinforcement rings 1510 can be assembled to the base 1010 in one or more of a variety of ways such as, for example and without limitation, using friction or adhesive between the reinforcement rings 1510 and the base 1010 or can be molded in place on the base 1010—such as in an overmolding process.

Figure 16:
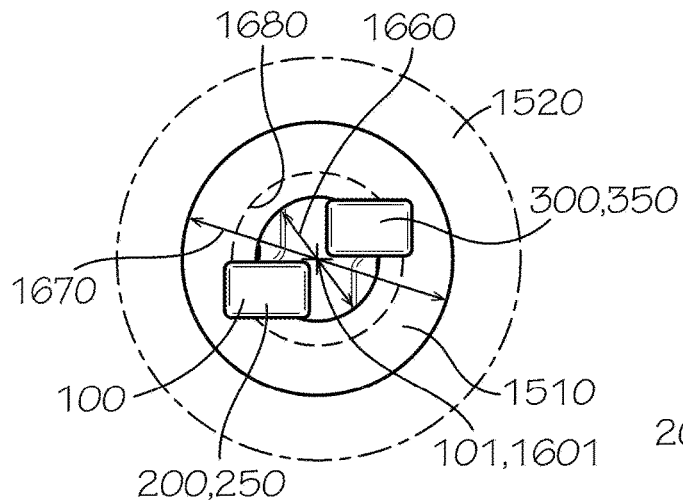
FIG. 16 is a detail view of the clip of FIG. 1 shown installed in the base of FIG. 14 through an reinforcement ring of the plurality of reinforcement rings, taken from detail 16 of FIG. 15, and shows the clip in accordance with another aspects of the current disclosure.

FIG. 16, taken from detail 16 of FIG. 15, is a detail view of the clip 100 in accordance with another aspect of the current disclosure shown installed in the base 1010 (shown in FIG. 14) through one of the plurality of reinforcement rings 1510. As shown, the centerline axis 101 can be substantially aligned with an axis 1601 of the reinforcement ring 1510. An inner diameter 1660 of any or each reinforcement ring 1510 of the plurality of reinforcement rings 1510 can be sized sufficiently large to allow passage of the respective barbs 250, 350 of the legs 200, 300 during installation and yet also sufficiently small to engage the same barbs 250, 350 after installation. More specifically, the inner diameter 1660 can be larger than the overall width 910 (shown in FIG. 9) of the clip 100 at the legs 200, 300 when the clips and, more specifically, the legs 200, 300 are in the flexed position. At the same time, the inner diameter 1660 can be smaller than the overall width 910 of the clip 100 at the legs 200, 300 when the clips and, more specifically, the legs 200, 300 are in the unflexed position or a final engaged position after installation. An outer diameter 1670 of any or each reinforcement ring 1510 of the plurality of reinforcement rings 1510 can be larger than the overall width 910 of the clip 100 at the legs 200, 300 in any position or condition including the unflexed position or a final engaged position after installation.

Figure 17:
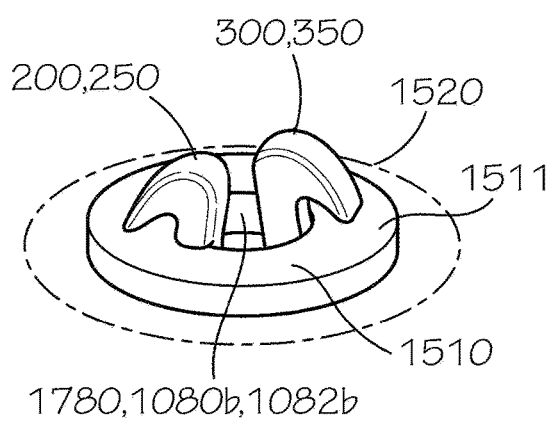
FIG. 17 is a bottom side perspective view of the installed clip of FIG. 16 as installed through the reinforcement ring.

FIG. 17 is a side perspective view of the installed clip 100 as installed through the reinforcement ring 1510. As shown, during engagement of the respective barbs 250, 350 of the legs 200, 300 with the reinforcement ring 1510, respective tips 254, 354 of the barbs 250, 350 can contact an outer surface 1511 of the reinforcement ring 1510. As also shown, a bore 1780 of the reinforcement ring 1510 can be or can define the hole 1080b comprising the intermediate portion 1082b. While slight interference may be visible in FIG. 17 between the legs 200, 300 of the clip 100 and the reinforcement ring 1510, such interference need not be present in all or in any aspects.

In some aspects, the hole 1080, the intermediate portion 1082 thereof, a hole (not shown) defined in the panel 1520 for receipt of the reinforcement ring 1510, or the bore 1780 can be circular in shape. In other aspects, the hole 1080, the intermediate portion 1082 thereof, the hole defined in the panel 1520 for receipt of the reinforcement ring 1510, or the bore 1780 can be rectangular in shape or, more generally, can define a polygonal shape. In some aspects, the hole 1080, the intermediate portion 1082 thereof, the hole defined in the panel 3620 for receipt of the reinforcement ring 1510, or the bore 1780 can be another shape. The hole 1080, the intermediate portion 1082 thereof, the hole defined in the panel 1520 for receipt of the reinforcement ring 1510, or the bore 1780 can be cut—such as, for example and without limitation, using a die cutting process—from the respective base 1010, the panel 1520, or the reinforcement ring 1510 or can be formed integrally with and during fabrication of the respective base 1010, the panel 1520, or the reinforcement ring 1510.

As discussed in International Publication No. WO 2020/245670, published Dec. 10, 2020, which is incorporated herein by reference, the cover 1090 (shown in FIG. 10) with the suspender 700 (shown in FIG. 10) and the clips 100 can be assembled to the base 1010 with a simple tool configured to push against the seam 1095 (shown in FIG. 10). Such a force can subsequently result in application of a force against the suspender 700 and the clips 100 tending to engage the clips 100 with the base 1010.

A method of assembly can comprise obtaining the base 1010, which can define the first surface 1011 and the second surface 1012 and a plurality of the holes 1080 extending from the first surface 1011 to the second surface 1012. The method can comprise inserting the clip 100 into the hole 1080 defined in the base 1010 and lockably engaging the clip in the hole 1080. Inserting the clip 100 into the hole 1080 defined in the base 1010 can comprise aligning the centerline axis 101 of the clip 100 with the central axis 1001 of the hole 1080 defined in the base 1010. The method can comprise installing the clips 100 by hand or with a machine. In some aspects, lockably engaging the clip 100 in the hole 1080 can comprise each of the first barb 250 of the first leg 200 and the second barb 350 of the second leg 300 engaging the base 1010 proximate to the first surface 1011 of the base 1010 or by contacting the first surface 1011 of the base 1010. More specifically, the method can comprise each of the first barb 250 of the first leg 200 and the second barb 350 of the second leg 300 and, more specifically, the tips 254, 354 engaging the raised portion 1089 of the base 1010. In some aspects, lockably engaging the clip can comprise contacting a surface of the base 1010 with a tip 254, 354 of each of the first barb 250 of the first leg 200 and the second barb 350 of the second leg 300. More specifically, the tip 254, 354 of each of the first barb 250 of the first leg 200 and the second barb 350 of the second leg 300 can extend past the corresponding inside barb shoulder 954 in the Z-axis direction. The method can further comprise pushing the seam 1095 of the cover 1090 comprising the clip 100 into full engagement with the base 1010. In some aspects, engaging the clips 100 with the base 1010 can comprise pushing the clips 100, from the outer surface 1092 of the cover 1090 with an assembly tool. In some aspects, engaging the clips 100 with the base 1010 can comprise pushing the clips 100, directly or indirectly through the cover 1090, by hand or with a machine. In some aspects, inserting the clip 100 into the hole 1080 can comprise the total leg offset distance 602 increasing when the first leg 200 and the second leg 300 are in contact with and moving past each other in the Y-axis direction. During assembly, the clip 100 can be configured to not rotate upon insertion into the base 1010 absent a countering moment to prevent any such rotation on the clip 100 about a direction of insertion of the clip, e.g., the Z-axis direction. Using one or more of the structures disclosed herein, such rotation can be prevented, and a clip insertion force can act fully to push the clip 100 into the hole 1080 instead of rotating the clip 100 as well. In some aspects, the benefits of non-rotation of the clip 100 during installation can comprise a lower clip installation force, less stress on the clip 100 during installation, and greater ease in aligning clips and maintaining alignment of the clips 100 in the holes 1080 in the base.

The method can comprise assembling the clip 100 to the suspender 700 (shown in FIG. 7) before assembling the clip 100 to the base 1010. The method can comprise reducing the overall width 910 of the clip 100 at the legs 200, 300 by pushing down on a top of the clip 100 in a direction angled with respect to the overall width 910. The method can comprise removing the clip 100 from a mating part such as, for example and without limitation, the base 1010 with the tool 1200. In some aspects, the method of removing the clip 100 with the tool 1200 can further comprise engaging the tool 1200 with each of the tool engagement shoulder 232 of the first leg 200 and the tool engagement shoulder 332 of the second leg 300 of the clip 100. The method can further comprise bending the first leg 200 and the second leg 300 toward each other with the tool 1200. In some aspects, the method can further comprise pushing the clip 100 down (i.e., in the negative Z-axis direction) at the top while bending the first leg 200 and the second leg 300 toward each other with the tool 1200.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A clip for securing a cover to a base, the clip comprising:
    a chuck defining a suspender retention cavity, the suspender retention cavity sized and configured to receive a suspender attached to the cover;
    a first leg extending from the chuck and comprising a first barb, the first barb extending outward with respect to a centerline axis of the clip; and
    a second leg extending from the chuck and comprising a second barb, the second barb extending outward with respect to the centerline axis of the clip;
    wherein a total leg offset distance measured in an X-axis direction of the clip between a centerline of the barb of the first leg and a centerline of the barb of the second leg is equal to or less than a secondary width of either of the barb of the first leg and the barb of the second leg in the X-axis direction.

2. The clip of claim 1, wherein:
    each of the first leg and the second leg define a tool engagement shoulder proximate to respective distal ends of the first leg and the second end;
    the tool engagement shoulder of the first leg and the tool engagement shoulder of the second leg are substantially parallel to each other when the first leg and the second leg are in a unflexed condition; and
    the tool engagement shoulder of the first leg and the tool engagement shoulder of the second leg are configured to simultaneously engage with a tool during removal and thereby be brought closer together by the tool during the removal.

3. The clip of claim 1, wherein:
    at least a portion of the first leg and at least a portion of the second leg exhibit point symmetry; and
    at least a portion of the first leg and at least a portion of the second leg exhibit plane symmetry.

4. The clip of claim 1, wherein the first leg defines a recessed portion in an end of the first leg and the second leg defines a recessed portion in an end of the second leg, the recessed portion of the first leg and the recessed portion of the second leg facing in opposite X-axis directions.

5. The clip of claim 4, wherein:
    the recessed portion of each of the first leg and the second leg defines a first portion and a second portion, the second portion being angled with respect to the first portion;
    the first portions of the recessed portions of the first leg and the second leg are parallel to each other; and
    the second portions of the recessed portions of the first leg and the second leg are parallel to each other.

6. The clip of claim 1, wherein each of the first leg and the second leg are configured to increase the total leg offset distance when the first leg and the second leg are in contact with and moving past each other in the Y-axis direction.

7. The clip of claim 1, wherein the first leg and the second leg overlap in the X-axis direction yet are able to pass each other and thereby overlap, at least in part, in a Y-axis direction when the first leg and the second leg are in a flexed condition.

8. The clip of claim 1, wherein the clip has rotational symmetry about the centerline axis.

9. An assembly comprising:
    the suspender; and
    the clip of claim 1, the clip being secured to the suspender.

10. A clip for securing a cover to a base, the clip comprising:
    a chuck defining a suspender retention cavity, the suspender retention cavity sized and configured to receive a suspender attached to the cover;
    a first leg extending from the chuck and comprising a first barb, the first barb extending outward with respect to a centerline axis of the clip; and
    a second leg extending from the chuck and comprising a second barb, the second barb extending outward with respect to the centerline axis of the clip;

wherein a tip of each of the first barb of the first leg and the second barb of the second leg is angled with respect to a remaining portion of the corresponding barb.

11. The clip of claim 10, wherein:
each of the first barb and the second barb defines an inside barb shoulder extending from and angled with respect to a portion of the corresponding leg extending from the chuck;
the tip of each of the first barb of the first leg and the second barb of the second leg extends past respective reference datum lines of the barbs; and
each reference datum line is defined by a tangent line of the corresponding inside barb shoulder nearest to the tip but not including the tip when viewed along an X-axis direction of the clip.

12. The clip of claim 10, wherein the tip of each of the first barb of the first leg and the second barb of the second leg defines a first side surface and a second side surface, a tangent line to each of first side surface and the second side surface of the clip defining a surface orientation angle with respect to a Y-axis direction of the clip measuring 90 degrees or less.

13. The clip of claim 10, wherein the tip of each of the first barb of the first leg and the second barb of the second leg defines a first side surface and a second side surface, a tip orientation angle with respect to a Y-axis direction of the clip measuring 90 degrees or more.

14. An assembly comprising:
the base, the base defining a hole configured to receive the clip, the hole defining a raised portion; and
the clip of claim 10, wherein the tip of each of the first barb of the first leg and the second barb of the second leg engages the raised portion.

15. The clip of claim 10, wherein the clip has rotational symmetry about the centerline axis.

16. An assembly comprising:
the suspender; and
the clip of claim 10, the clip being secured to the suspender.

17. A method comprising:
inserting a clip for securing an upholstery cover into a hole defined into a base, the clip comprising:
a chuck defining a suspender retention cavity, the suspender retention cavity sized and configured to receive a suspender attached to the cover;
a first leg extending from the chuck and comprising a first barb, the first barb extending outward with respect to a centerline axis of the clip; and
a second leg extending from the chuck and comprising a second barb, the second barb extending outward with respect to the centerline axis of the clip;
wherein a distance in an X-axis direction of the clip between a centerline of the barb of the first leg and a centerline of the barb of the second leg is equal to or less than a thickness of either of the barb of the first leg and the barb of the second leg in the X-axis direction; and
pushing the clip into a hole defined in the base without applying a moment to encourage rotation of the clip about the X-axis direction or a countering moment to prevent rotation of the clip about a Z-axis direction of the clip.

18. The method of claim 17, wherein inserting the clip into the hole comprises the total leg offset distance increasing when the first leg and the second leg are in contact with and moving past each other in the Y-axis direction, the method further comprising lockably engaging the clip in the hole of the base.

19. The method of claim 18, wherein:
the first barb defines an inside barb shoulder extending from and angled with respect to a portion of the first leg extending from the chuck;
the second barb defines an inside barb shoulder extending from and angled with respect to a portion of the second leg extending from the chuck; and
lockably engaging the clip comprises contacting a surface of the base with a tip of each of the first barb of the first leg and the second barb of the second leg, the tip of each of the first barb of the first leg and the second barb of the second leg extending past the corresponding inside barb shoulder in the Z-axis direction.

20. The method of claim 17, wherein the clip has rotational symmetry about the centerline axis.

\* \* \* \* \*